(12) United States Patent
Ma et al.

(10) Patent No.: US 12,041,231 B2
(45) Date of Patent: Jul. 16, 2024

(54) IN-LOOP FILTERING METHOD AND DEVICE

(71) Applicant: SZ DJI TECHNOLOGY CO., LTD., Shenzhen (CN)

(72) Inventors: Siwei Ma, Beijing (CN); Xuewei Meng, Beijing (CN); Xiaozhen Zheng, Shenzhen (CN); Shanshe Wang, Beijing (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 106 days.

(21) Appl. No.: 17/853,906

(22) Filed: Jun. 29, 2022

(65) Prior Publication Data

US 2022/0345699 A1 Oct. 27, 2022

Related U.S. Application Data

(63) Continuation of application No. PCT/CN2019/130954, filed on Dec. 31, 2019.

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/176* (2014.11);
(Continued)

(58) Field of Classification Search
CPC .. H04N 19/117; H04N 19/132; H04N 19/176; H04N 19/186; H04N 19/70; H04N 19/82
(Continued)

(56) References Cited

U.S. PATENT DOCUMENTS 11,863,779 B2 * 1/2024 Hu ..................... H04N 19/82
2012/0051438 A1 3/2012 Chong et al.
(Continued)

FOREIGN PATENT DOCUMENTS

CN 104683819 A 6/2015
CN 104735450 A 6/2015
(Continued)

OTHER PUBLICATIONS

The World Intellectual Property Organization (WIPO) International Search Report for PCT/CN2019/130954 Aug. 27, 2020 5 Pages.
(Continued)

*Primary Examiner* — Kathleen M Walsh
(74) *Attorney, Agent, or Firm* — ANOVA LAW GROUP, PLLC

(57) ABSTRACT

An in-loop filtering method includes determining a target filter for a chrominance component of a current block of an image from a plurality of cross-component ALF filters, determining target filter coefficients for the chrominance component according to the chrominance component after ALF and a luminance component of the current block without ALF, filtering the chrominance component after ALF according to the target filter and the target filter coefficients, determining a filtered chrominance component of the current block according to the chrominance component after being filtered with the target filter coefficients and the chrominance component after the ALF, encoding according to the filtered chrominance component of the current block, and encoding a total number of the plurality of cross-component ALF filters as a syntax element. A stream of the image includes only one syntax element for indicating the total number of the plurality of cross-component ALF filters.

14 Claims, 8 Drawing Sheets

(51) Int. Cl.
*H04N 19/176* (2014.01)
*H04N 19/186* (2014.01)
*H04N 19/70* (2014.01)
*H04N 19/82* (2014.01)

(52) U.S. Cl.
CPC .......... *H04N 19/186* (2014.11); *H04N 19/70* (2014.11); *H04N 19/82* (2014.11)

(58) Field of Classification Search
USPC .................................................... 375/240.02
See application file for complete search history.

(56) References Cited

U.S. PATENT DOCUMENTS

| | | | |
|---|---|---|---|
| 2018/0063527 A1 | 3/2018 | Chen et al. | |
| 2018/0288441 A1 | 10/2018 | Zhang et al. | |
| 2021/0044834 A1* | 2/2021 | Li | H04N 19/186 |
| 2021/0076032 A1* | 3/2021 | Hu | H04N 19/159 |
| 2021/0084295 A1* | 3/2021 | Chen | H04N 19/70 |
| 2021/0084340 A1* | 3/2021 | Li | H04N 19/176 |
| 2021/0092370 A1* | 3/2021 | Hu | H04N 19/176 |
| 2021/0152841 A1* | 5/2021 | Hu | H04N 19/86 |
| 2021/0160513 A1* | 5/2021 | Hu | H04N 19/82 |
| 2021/0176501 A1* | 6/2021 | Chen | H04N 19/186 |
| 2022/0264106 A1* | 8/2022 | Zhang | H04N 19/117 |
| 2022/0345698 A1* | 10/2022 | Misra | H04N 19/176 |
| 2022/0408085 A1* | 12/2022 | Lim | H04N 19/82 |
| 2023/0023387 A1* | 1/2023 | Ström | H04N 19/186 |

FOREIGN PATENT DOCUMENTS

| | | |
|---|---|---|
| CN | 109479130 A | 3/2019 |
| CN | 114586347 A | 6/2022 |
| CN | 114586350 A | 6/2022 |
| WO | 2019060443 A1 | 3/2019 |
| WO | 2019189344 A1 | 10/2019 |

OTHER PUBLICATIONS

Lidong Luo, et al., "A low Complexity Adaptive Loop Filter Algorithm for Multi-View Video Coding", Journal of Optoelectronics. Laser, vol. 25, No. 2, Feb. 15, 2014.

Siwei Ma, et al., "Kernel technologies and applications of AVS2 video coding standard", Telecommunications Science, Aug. 20, 2017.

Tsai C Y, Chen C Y, Yamakage T, et al. Adaptive loop filtering for video coding[J]. IEEE Journal of Selected Topics in Signal Processing. 7(6). Jul. 2013: 934-945.

M. Karczewicz, L. Zhang, W.-J. Chien, and X. Li, "Geometry transformation-based adaptive in-loop filter," in Picture Coding Symposium (PCS), 2016. IEEE, 2016, pp. 1-5.

Kiran Misra et al., CES-related: On the design of CC-ALF, Joint Video Experts Team (JVET) Document: JVET-P1008-v2 of ITU-T SG 16 WP 3 and ISO/IEC JTC 1/SC 29/WG 11 16th Meeting: Geneva, CH, Oct. 1-11, 2019, pp. 1-6.

Benjamin Bross, Versatile Video Coding (Draft 6), Joint Video Experts Team (JVET) of ITU-T SG 16 WP 3 and ISO/IEC JTC 1/SC 29/WG 11 15th Meeting: Gothenburg, SE, Jul. 3-12, 2019, pp. 1-460.

Kiran Misra et al., "Cross-Component Adaptive Loop Filter for chroma," Joint Video Experts Team (JVET) of ITU-T SG 16 WP 3 and ISO/IEC JTC 1/5C /WG 11, 15th Meeting, Jul. 7, 2019 (9 pages).

Jonathan Taquet et al., "Parsability of ALF Chroma Filter alternative signaling," Joint Video Experts Team (JVET) of ITU-T SG 16 WP 3 and ISO/IEC JTC 1/5C /WG 11, 16th Meeting, Sep. 25, 2019 (4 pages).

Nan Hu et al. , Non-CE5: Using truncated binary codes for ALF filter indices , Joint Video Experts Team (JVET) of ITU-T SG 16 WP 3 and ISO/IEC JTC 1/SC 29/WG 11 16th Meeting: Geneva, CH, Oct. 1-11, 2019 , JVET-P05 53_v2, Oct. 7, 2019, p. 1.

Benjamin Bross et al. , Versatile Video Coding (Draft 7) , Joint Video Experts Team (JVET) of ITU-T SG 16 WP 3 and ISO/IECJTC 1/SC 29/WG 11 16th Meeting: Geneva, CH, Oct. 1-11, 2019 , JVET-P2001-vE , Dec. 30, 2019, pp. 50-51,56-58,124,140-141,360-361.

* cited by examiner

IN-LOOP FILTERING METHOD AND DEVICE

CROSS-REFERENCE TO RELATED APPLICATION

This application is a continuation of International Application No. PCT/CN2019/130954, filed Dec. 31, 2019, the entire content of which is incorporated herein by reference.

TECHNICAL FIELD

The present disclosure relates to the field of digital video encoding technologies and, more particularly, to an in-loop filtering method and device.

BACKGROUND

Currently, to reduce bandwidth occupied by video storage and transmission, video data needs to be encoded and compressed. In present commonly used encoding technologies, an encoding and compression process of video includes: block division, prediction, transformation, quantization, and entropy encoding, which form a hybrid video encoding framework. Based on the hybrid video encoding framework, video encoding and decoding technology standards have gradually formed after decades of development. Some current mainstream video encoding and decoding standards include: international video encoding standards H.264/MPEG-AVC and H. 265/MPEG-HEVC, domestic audio and video encoding standard AVS2, and H.266/VVC international standard and AVS3 domestic standard currently being made.

In the encoding process of block division, prediction, transformation, quantization and entropy encoding, because of existence of quantization, there will be compression distortions such as block effect or ringing effect in the decoded and reconstructed video. At the same time, in an inter-frame prediction mode, the compression distortions in the reconstructed video can affect the encoding quality of subsequent images. Therefore, to reduce the compression distortion, an in-loop filtering technology is introduced into the encoding/decoding structure framework to improve the quality of the current decoded image and provide high-quality reference images for subsequent encoded images, thereby improving the compression efficiency.

In the versatile video coding (VVC) standard currently under developing and some high-performance video coding (HEVC) standards, an in-loop filter includes a deblocking filter (DBF), a sample adaptive offset filter (SAO), or an adaptive loop filter (ALF). The filtering process still has room for improvement.

SUMMARY

In accordance with the disclosure, there is provided an in-loop filtering method including determining a target filter for a chrominance component of a current block of an image from a plurality of cross-component ALF filters, determining target filter coefficients for the chrominance component according to the chrominance component after ALF and a luminance component of the current block without ALF, filtering the chrominance component after ALF according to the target filter and the target filter coefficients, determining a filtered chrominance component of the current block according to the chrominance component after being filtered with the target filter coefficients and the chrominance component after the ALF, encoding according to the filtered chrominance component of the current block, and encoding a total number of the plurality of cross-component ALF filters as a syntax element. A stream of the image includes only one syntax element for indicating the total number of the plurality of cross-component ALF filters.

Also in accordance with the disclosure, there is provided an in-loop filtering method including decoding a total number of cross-component ALF filters and an index of a target filter from a stream. The target filter is an ALF filter adopted by a chrominance component of a current block of an image and a stream of the image contains only one syntax element for indicating the total number of the cross-component ALF filters. The method further includes decoding target filter coefficients for the chrominance component from the stream. The target filter coefficients are coefficients in the target filter. The method also includes performing filtering on the chrominance component after ALF according to the target filter and the target filter coefficients, and determining a filtered chrominance component of the current block according to the chrominance component filtered with the target filter coefficients and the chrominance component after ALF.

Also in accordance with the disclosure, there is provided a non-transitory computer-readable storage medium storing data encoded using an in-loop filtering method including determining a target filter for a chrominance component of a current block of an image from a plurality of cross-component ALF filters, determining target filter coefficients for the chrominance component according to the chrominance component after ALF and a luminance component of the current block without ALF, filtering the chrominance component after ALF according to the target filter and the target filter coefficients, determining a filtered chrominance component of the current block according to the chrominance component after being filtered with the target filter coefficients and the chrominance component after the ALF, encoding according to the filtered chrominance component of the current block, and encoding a total number of the plurality of cross-component ALF filters as a syntax element. A stream of the image includes only one syntax element for indicating the total number of the plurality of cross-component ALF filters.

DETAILED DESCRIPTION OF THE EMBODIMENTS

The technical solutions in the embodiments of the present disclosure will be described below with reference to the accompanying drawings.

The embodiments of the present disclosure are applicable to standard or non-standard image or video encoders, such as an encoder of the VVC standard.

It should be understood that the specific examples and embodiments herein are only for helping those skilled in the art to better understand the embodiments of the present disclosure, rather than limiting the scope of the embodiments of the present disclosure.

It should also be understood that the formulas in the embodiments of the present disclosure are used as examples to illustrate the present disclosure, and do not limit the scope of the embodiments of the present disclosure. Each formula can be modified, and these modifications should also belong to the protection scope of the present disclosure.

It should also be understood that, in various embodiments of the present disclosure, the values of the sequence numbers of various processes do not mean the order of execution, and the execution order of the various processes should be determined by their functions and internal logics, and the present disclosure has no limit on this.

It should also be understood that the various implementation manners described in the present disclosure may be implemented individually or in combination, which are not limited by the embodiments of the present disclosure.

Unless otherwise specified, all technical and scientific terms used in the embodiments of the present disclosure have the same meaning as commonly understood by those skilled in the art. The terminology used in the present disclosure is for the purpose of describing specific embodiments only and is not intended to limit the scope of the present disclosure. As used herein, the term "and/or" includes any or all combinations of one or more of the associated listed items.

Figure 1:
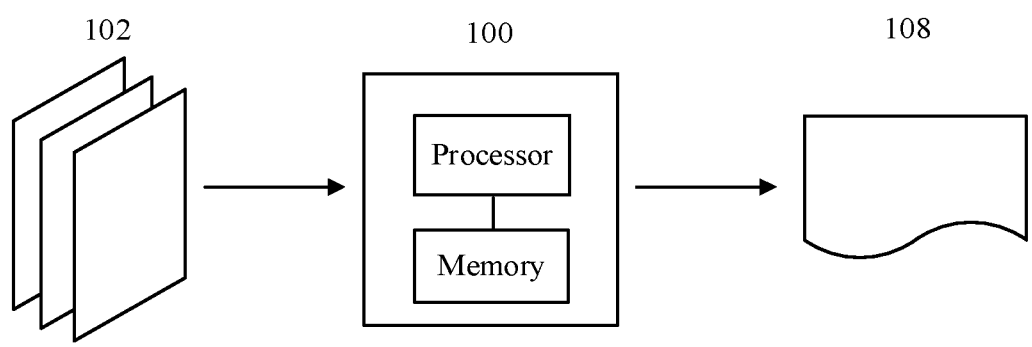
FIG. 1 is a structural diagram of a technical scheme implementing embodiments of the present disclosure.

FIG. 1 shows a structure of a technical scheme implementing embodiments of the present disclosure.

As shown in FIG. 1, a system 100 receives to-be-processed data 102, and processes the to-be-processed data 102 to generate processed data 108. For example, the system 100 may receive data to be encoded and encode the data to be encoded to generate encoded data, or the system 100 may receive data to be decoded and decode the data to be decoded to generate decoded data. In some embodiments, components in the system 100 may be implemented by one or more processors. The one or more processors may be processors in a computing device or processors in a mobile device (such as an unmanned aerial vehicle). The one or more processors may be any type of processor, which is not limited in the embodiments of the present disclosure. In some embodiments, the one or more processors may include an encoder, a decoder, or a codec, etc. One or more memories may also be included in the system 100. The one or more memories may be used to store instructions or data, for example, including computer-executable instructions that implement the technical solutions of the embodiments of the present disclosure, the to-be-processed data 102, or the processed data 108, etc. The one or more memories may be any type of memory, which is not limited in the embodiments of the present disclosure.

The data to be encoded may include text, images, graphic objects, animation sequences, audio, video, or any other data that needs to be encoded. In some embodiments, the data to be encoded may include sensor data from sensors including vision sensors (for example, cameras, infrared sensors), microphones, near-field sensors (for example, ultrasonic sensors, radar), position sensors, temperature sensors, or touch sensors, etc. In some other embodiments, the data to be encoded may include information from the user, for example, biological information. The biological information may include facial features, fingerprint scans, retinal scans, voice recordings, DNA sampling, and so on.

Figure 2:
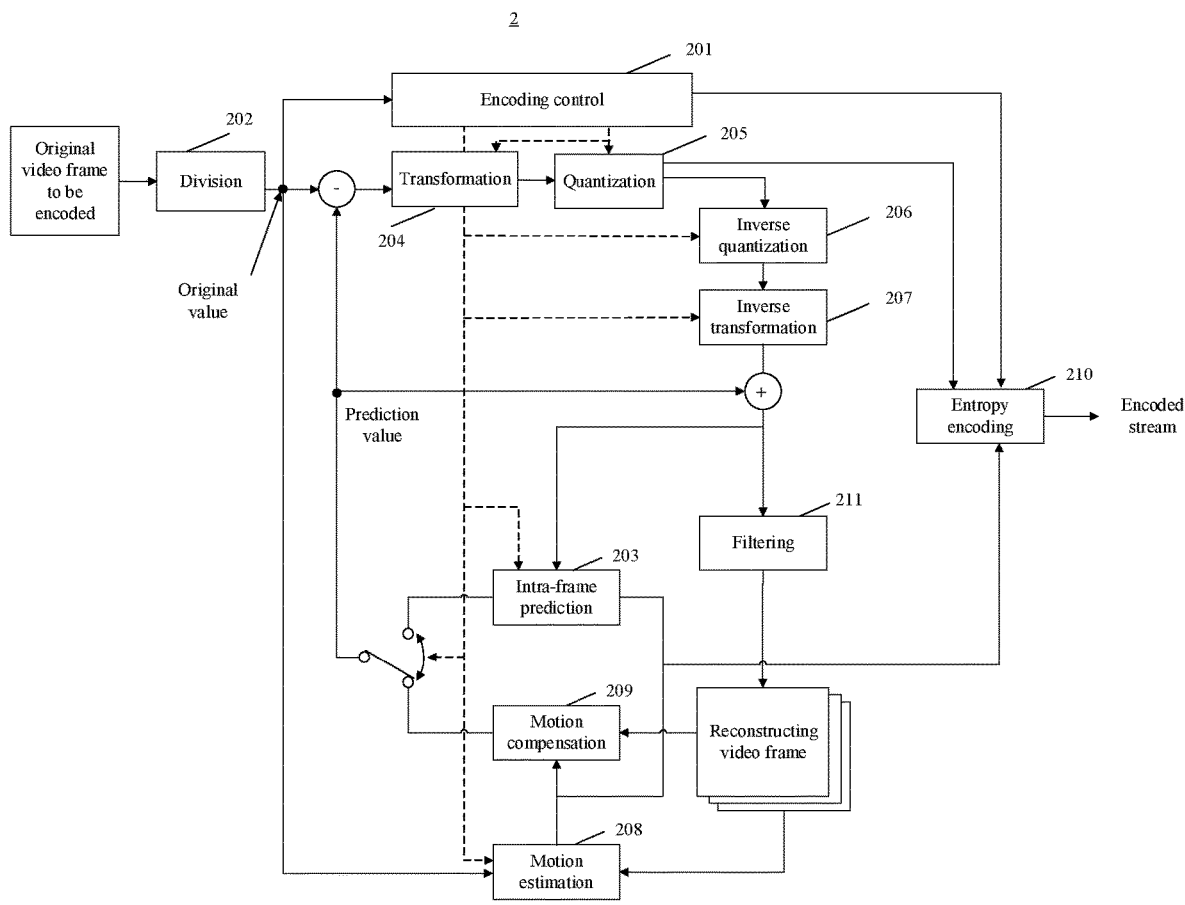
FIG. 2 is a schematic diagram of a video encoding framework consistent with an embodiment of the present disclosure.

FIG. 2 shows a video encoding framework according to one embodiment of the present disclosure. As shown in FIG. 2, after the video to be encoded is received, starting from a first frame of the video to be encoded, frames of the video to be encoded are encoded in sequence. A current encoding frame is mainly subject to prediction, transformation, quantization, and entropy encoding, and finally stream of the current encoding frame is output. Correspondingly, a decoding process usually decodes received stream according to an inverse process of the above process, to recover the video frame information before encoding.

Specifically, as shown in FIG. 2, the video encoding framework 2 includes an encoding control module 201 for performing decision control actions and selection of parameters in the encoding process. For example, as shown in FIG. 2, the encoding control module 201 controls parameters used in transformation, quantization, inverse quantization, or inverse transformation, controls selection of intra-frame or inter-frame modes, or controls parameters of motion estimation and filtering. Control parameters of the encoding control module 201 will also be input into an entropy encoding module, to be encoded for forming a part of the encoded stream.

When the current to-be-encoded frame starts to be encoded, the to-be-encoded frame is divided in 202. Specifically, the to-be-encoded frame is first subject to slice division, and then to block division. Optionally, in an example, the to-be-encoded frame may be divided into a plurality of non-overlapping largest coding tree units (CTUs), and each CTU may also be divided iteratively into a series of smaller coding units (CUs) according to quadtree, binary tree, or ternary tree division respectively. In some examples, CUs may also include prediction units (PUs) and transform units (TUs) associated with them, where a PU is a basic unit of prediction and a TU is a basic unit of transformation and quantization. In some examples, a PU or a TU may be respectively obtained by dividing a CU into one or more blocks. One PU may include a plurality of prediction blocks (PBs) and related syntax elements. In some examples, the PUs and the TUs may be the same, or may be obtained by dividing the CU through different division methods. In some examples, at least two of CUs, PUs, and TUs may be the same. For example, the CUs, PUs, and TUs may be not distinguished from each other, and may all be predicted, quantized, and transformed in units of the CUs. For the convenience of description, hereinafter, the CTUs, CUs or other formed data units are all referred to as encoding blocks.

It should be understood that, in embodiments of the present disclosure, a data unit targeted for video encoding may be a frame, a slice, a coding tree unit, a coding unit, a coding block, or a group of any of the above. In different embodiments, the size of the data unit may vary.

Specifically, as shown in FIG. 2, after the to-be-encoded frame is divided into a plurality of coding blocks, a prediction process is performed to remove redundant information in spatial and temporal domains of the current to-be-encoded frame. Currently, the commonly used predictive encoding methods include intra-frame prediction and inter-frame prediction. The intra-frame prediction only uses the reconstructed information in the current frame to predict the current coding block, while the inter-frame prediction uses the information in other frames (also called reference frames) that have been reconstructed before to predict the current coding block. Specifically, in embodiments of the present disclosure, the encoding control module 201 is configured to decide whether to select the intra-frame prediction or the inter-frame prediction.

When the intra-frame prediction mode is selected, the process of intra-frame prediction 203 includes: obtaining a reconstructed block of adjacent encoded blocks around the current encoding block as a reference block, and using a prediction mode method to calculate a prediction value based on a pixel value of the reference block to generate a prediction block, subtracting the corresponding pixel values of the current encoding block and the prediction block to obtain the residual of the current encoding block, and performing transformation 204, quantization 205, and entropy encoding 210 on the residual of the current coding block to form the stream of the current coding block. Further, all encoding blocks of the current to-be-encoded frame may undergo the above encoding process, to form a part of the encoded stream of the to-be-encoded frame. In addition, control and reference data generated in the intra-frame prediction 203 may be also encoded by entropy encoding 210 to form a part of the encoded stream.

Specifically, the transformation 204 may be used to remove correlation of the residuals of image blocks, to improve encoding efficiency. For the transformation of the residual data of the current encoding block, two-dimensional discrete cosine transformation (DCT) or two-dimensional discrete sine transformation (DST) are usually used. For example, the residual information may be multiplied by an N×M transformation matrix and its transposed matrix respectively in an encoding end, and the transformation coefficients of the current encoding block may be obtained after the multiplication.

After the transformation coefficients are generated, quantization 205 may be used to further improve the compression efficiency. The transformation coefficients may be quantized to obtain quantized coefficients, and then the entropy encoding 210 may be performed on the quantized coefficients to obtain a residual stream of the current encoding block. The entropy encoding method may include but is not limited to a content adaptive binary arithmetic coding (CABAC) entropy encoding method.

Specifically, the encoded adjacent block in the intra-frame prediction 203 may be an adjacent block that has been encoded before the current encoding block is encoded, and the residual generated when encoding the adjacent block may be added to the prediction block of the adjacent block after transformation 204, quantization 205, inverse quantization 206 and inverse transformation 207, to obtain the reconstructed block. Correspondingly, inverse quantization 206 and inverse transformation 207 may be inverse processes of quantization 206 and transformation 204, to restore residual data before quantization and transformation.

As shown in FIG. 2, when the inter-frame prediction mode is selected, the inter-frame prediction process includes motion estimation 208 and motion compensation 209. Specifically, the motion estimation 208 may be performed according to the reference frame image in the reconstructed video frame, and an image block most similar to the current encoding block may be searched in one or more reference frame images according to a certain matching criterion, as a matching block. A relative displacement of the matching block relative to the current encoding block may be a motion vector (MV) of the current block to be encoded. After motion estimation is performed on all encoding blocks in the to-be-coded frame, motion compensation 209 may be performed on the current to-be-coded frame based on the motion vector and the reference frame, and the predicted value of the current to-be-encoded frame may be obtained. The residual of the to-be-encoded frame may be obtained by subtracting the original pixel value of the to-be-encoded frame and the corresponding prediction value. The residual of the current to-be-encoded frame may form a part of the encoded stream of the to-be-encoded frame after transformation 204, quantization 205 and entropy encoding 210. In addition, the control and reference data generated in motion compensation 209 may be also encoded by entropy encoding 210 to form a part of the encoded stream.

Specifically, as shown in FIG. 2, the reconstructed video frame is a video frame obtained after filtering 211. Filtering 211 may be used to reduce compression distortion such as blocking effect and ringing effect produced during encoding. In the encoding process, the reconstructed video frame may be used to provide the reference frame for the inter-frame prediction. In the decoding process, the reconstructed video frame may be post-processed and output as the final decoded video. In one embodiment, the filtering 211 may include at least one of deblocking (DB) filtering, sample adaptive offset (SAO) filtering, adaptive loop filtering (ALF), or cross-component ALF (CC-ALF). For example, ALF may be set up after DB or SAO. As another example, chroma components after ALF may be filtered with luma components before ALF. Filtering parameters in the filtering 211 may be also sent to entropy encoding for encoding to form a part of the encoded stream.

Figure 3:
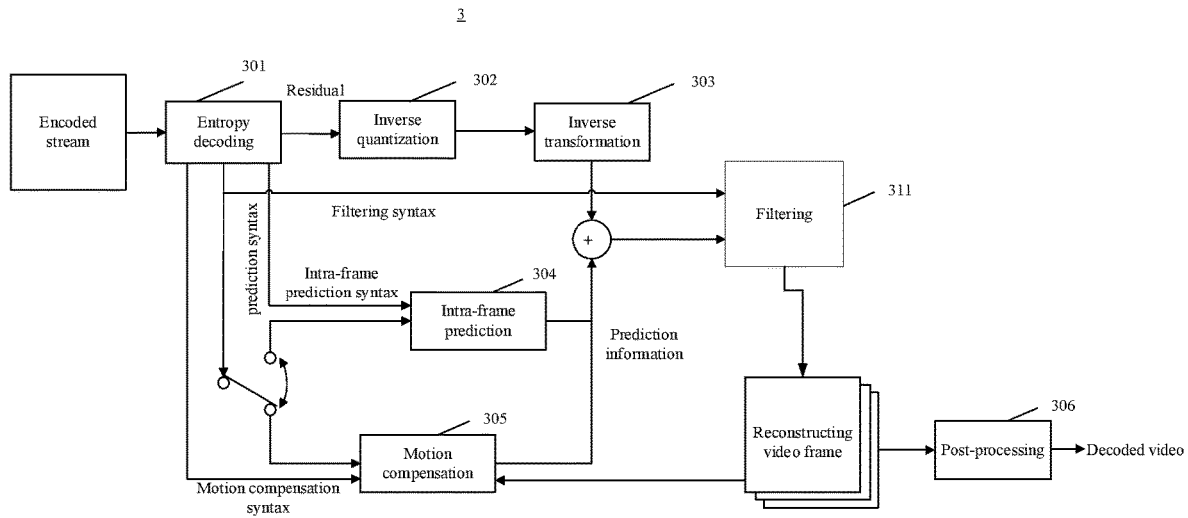
FIG. 3 is a schematic diagram of a video decoding framework consistent with an embodiment of the present disclosure.

FIG. 3 is a schematic diagram of a video decoding framework 3 provided by one embodiment of the present disclosure. As shown in FIG. 3, video decoding performs operations corresponding to video encoding. First, entropy decoding 301 is used to obtain one or more kinds of data information among residual data, prediction syntax, intra-frame prediction syntax, motion compensation syntax or filter syntax in the encoded stream. The residual data may be subjected to inverse quantization 302 and inverse transformation 303 to obtain original residual data information. Further, whether a current decoding block uses intra-frame prediction or inter-frame prediction is determined according to the prediction syntax. When the intra-frame prediction 304 is used, then the intra-frame prediction syntax is obtained according to decoding and a reconstructed image block in the current frame is used to construct prediction information according to the intra-frame prediction method. When the inter-frame prediction is used, according to decoded motion compensation syntax, the reference block is determined in the reconstructed image to obtain the prediction information. Subsequently, the prediction information and the residual information are superimposed, and then the reconstructed video frame is obtained after filtering 311. The reconstructed video frame is subjected to post-processing 306 to obtain the decoded video.

Specifically, in one embodiment, the filtering 311 may be the same as the filtering 211 in FIG. 2, and may include at least one of deblocking (DB) filtering, sample adaptive offset (SAO) filtering, adaptive loop filtering (ALF), or cross-component ALF (CC-ALF). Filtering parameters and control parameters in the filtering 311 may be obtained by performing entropy decoding on the encoded stream, and filtering may be performed based on the obtained filtering parameters and control parameters respectively.

In one example, the DB filtering may be used to process the pixels on the boundary between a prediction unit PU and a transform unit TU, and a low-pass filter obtained by training may be used to perform nonlinear weighting of the boundary pixels, thereby reducing blocking effect. In another example, the SAO filtering may use the encoding blocks in the frame image as units, and classify the pixel values in the encoding blocks. Compensation values may be added to each type of pixels. Different encoding blocks may use different filtering forms and different types of pixels in different encoding blocks may use different compensation values, such that the reconstructed frame image is closer to the original frame image and the ringing effect is avoided. In another example, ALF filtering may be a Wiener filtering process. According to principles of Wiener filtering, filtering coefficients may be calculated for filtering. The ALF filtering may be mainly used to minimize a mean square error (MSE) between the reconstructed frame image and the original frame image. The image quality of the reconstructed frame may be further enhanced, the accuracy of motion estimation and motion compensation, and the encoding efficiency of the entire encoding system may be effectively improved. At the same time, the complexity of ALF filtering may be high, the operation may be time-consuming, and there may be certain defects in the actual application process.

Figure 4:
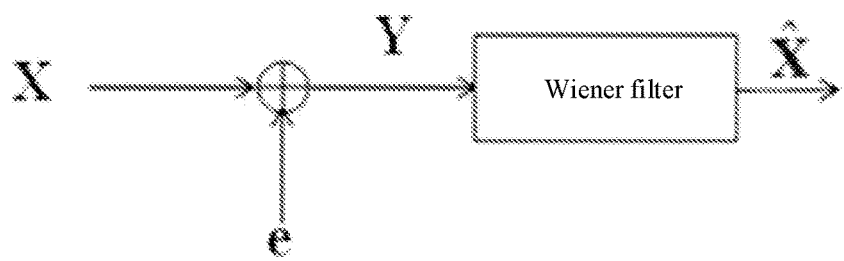
FIG. 4 is a schematic diagram of a Wiener filter consistent with an embodiment of the present disclosure.

For ease of understanding, an example of the ALF filtering process is described below with reference to FIG. 4, FIG. 5A, and FIG. 5B.

ALF Filter Coefficient Calculation Principle

First, according to the principle of Wiener filtering, the calculation method for calculating the ALF filter coefficients is explained. As shown in FIG. 4, a pixel signal in the original encoding frame currently being encoded is X, and the reconstructed pixel signal after encoding, DB filtering, and SAO filtering is Y, and the noise or distortion introduced by Y in this process is e. The reconstructed pixel signal is filtered by the Wiener filter with the filter coefficient to form an ALF reconstructed signal $\hat{X}$, such that the mean square error of the ALF reconstructed signal $\hat{X}$ relative to the original pixel signal is the smallest and obtained f is the ALF filter coefficient. Specifically, the calculation formula for f is:

$$f = \arg\min_{f} \|X - f * Y\|_2^2.$$

Figure 5A:
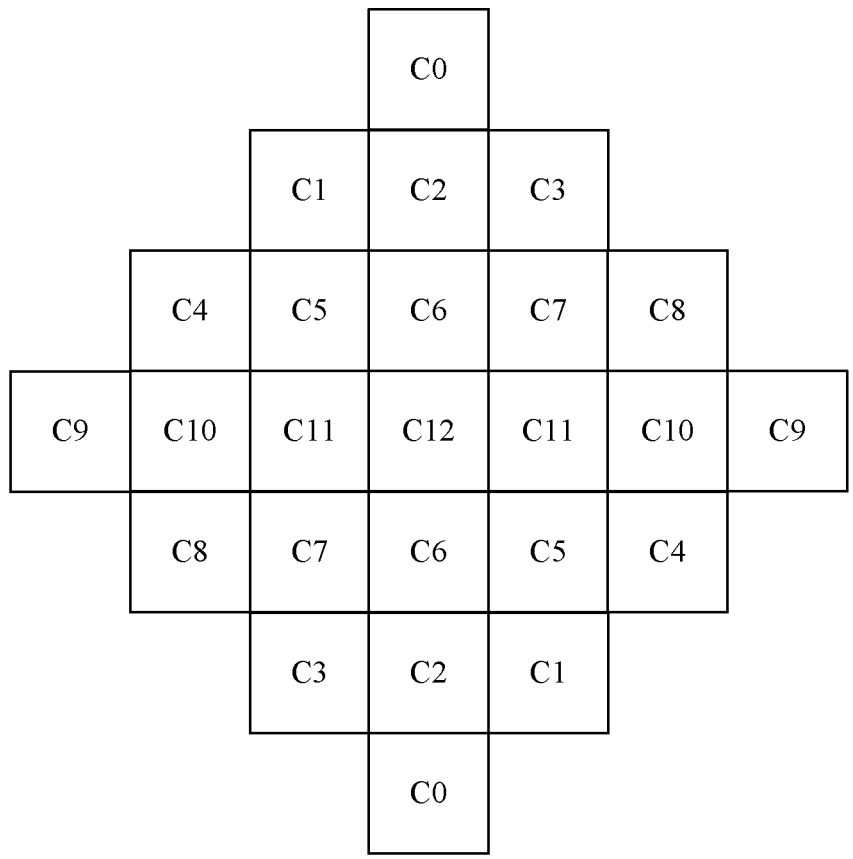
FIG. 5A is schematic diagram of an ALF filter consistent with an embodiment of the present disclosure.
Figure 5B:
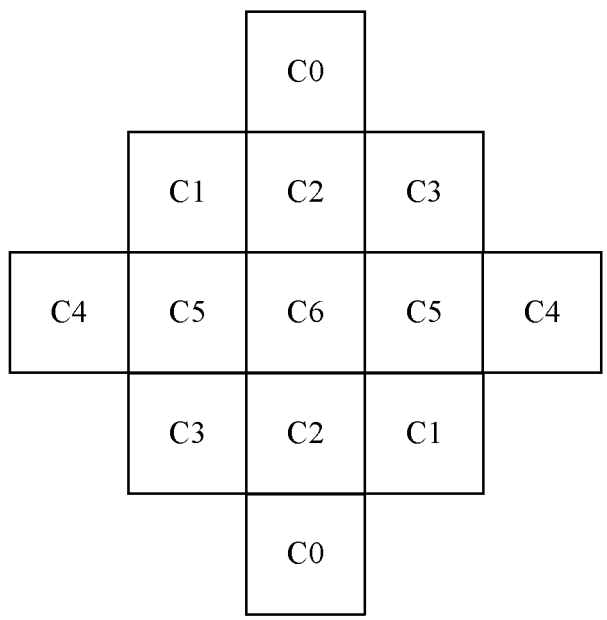
FIG. 5B is a schematic diagram of another ALF filter consistent with an embodiment of the present disclosure.

Optionally, in one embodiment, a filter composed of a set of ALF filter coefficients, as shown in FIGS. 5A and 5B, has 13 symmetrically distributed filter coefficients C0~C12 and a filter length L of 7; or 7 symmetrically distributed filter coefficients C0~C6 and a filter length L of 5. Optionally, the filter shown in FIG. 5A is also called a 7*7 filter, which is suitable for encoding frame luminance components, and the filter shown in FIG. 5B is also called a 5*5 filter, which is suitable for encoding frame chrome components.

It should be understood that, in other embodiments of the present disclosure, the filter composed of the ALF filter coefficients may also be a filter of another form, such as a filter having a symmetrical distribution and a filter length of 9. The present disclosure has no limit on this.

Optionally, in a linear ALF filtering process, for a pixel to be filtered in the reconstructed image frame, a weighted average of the surrounding pixels may be used to obtain the result after filtering of the current pixel, that is, a corresponding pixel in the ALF reconstructed image frame. Specifically, the pixel point I(x, y) in the reconstructed image frame is the current pixel point to be filtered, (x, y) is the position coordinates of the current pixel point to be filtered in the encoded frame, and a filter coefficient at a center of the filter corresponds to it. Other filter coefficients in the filter correspond to the pixels around I(x,y) in a one-to-one correspondence. The filter coefficient values in the filter are the weight values, and the filter coefficient values in the filter may be multiplied by the corresponding pixel points, added, and averaged. The obtained value may be the pixel value O(x, y) after filtering of the current pixel point to be filtered I(x, y). The specific calculation formula is:

$$O(x,y)=\Sigma_{(i,j)}w(i,j)*I(x+i,y+j),$$

where, w(i, j) represents any filter coefficient in the filter, (i, j) represents the relative position of the filter coefficient in the filter from the center point, i and j are both integers less than L/2 and greater than −L/2, and L is the length of the filter. For example, in the filter shown in FIG. 5A, the filter coefficient C12 at the center of the filter is denoted as w(0,0), the filter coefficient C6 above C12 is denoted as w(0,1), and the filter coefficient C11 to the right of C12 is denoted as w(1,0).

In this way, each pixel in the reconstructed image frame may be sequentially filtered to obtain the filtered ALF reconstructed image frame.

Optionally, in one embodiment, the filter coefficient w(i, j) of the filter may be an integer between [−1, 1).

Optionally, in one embodiment, the filter coefficient w(i,j) may be amplified by 128 times and then rounded to obtain w'(i,j), where w'(i,j) is an integer in [−128,128). Specifically, encoding and transmitting the amplified w'(i, j) may be easy to be implemented with hardware encoding and decoding. The calculation formula for filtering using the amplified w'(i, j) to obtain O(x, y) is:

$$O(x, y) = \left(\sum_{i=-\frac{L}{2}}^{\frac{L}{2}} \sum_{j=-\frac{L}{2}}^{\frac{L}{2}} w'(i,j)*I(x+i,y+j)+64\right)/128.$$

Optionally, in another nonlinear ALF filtering process, the filtering results obtained by the weighted average of multiple pixels using the filter directly as the weight may be not used. Instead, a nonlinear parameter factor may be introduced to optimize the filtering effect. Specifically, the calculation formula for using the nonlinear ALF filter to filter I(x, y) and calculate to obtain of O'(x, y) is:

$$O'(x,y)=I(x,y)+\Sigma_{(i,j)\neq(0,0)}w(i,j)*K(I(x+i,y+j)-I(x,y)* k(i,j)),$$

where the filter coefficient w(i, j) of the filter is an integer between [−1, 1) and K(d,b) is a clip operation with K(d, b)=min (b, max(−b, d)).

Specifically, in the K(d,b) clip operation, k(i,j) represents an in-loop filter ALF correction clip parameter, hereinafter referred to as the correction parameter or clip parameter, and each filter coefficient w(i,j) corresponds to a clip parameter. When encoding frame luminance components, the clip parameter may be one selected from {1024, 181, 32, 6}. When the frame chrominance components are being encoded, the clip parameter may be one selected from {1024, 161, 25, 4}. An index corresponding to each clip parameter, that is, the clip index parameter, may be written into the stream. If the clip parameter is 1024, the clip index parameter 0 may be written into the stream. Similarly, if the clip parameter is 181, 1 may be written into the stream. Therefore, it can be seen that the clip index parameters for encoding the frame luminance components and the frame chrominance components may all be integers between 0 and 3.

Pixel Classification

Subsequently, if a set of corresponding ALF filter coefficients is calculated for each pixel, it will be computationally complex and time-consuming. Also, if the ALF coefficients of each pixel are written into the stream, huge overhead will be incurred. Therefore, it is needed to classify and divide the pixels in the reconstructed image, and each type of pixel adopts a same set of ALF filter coefficients (a kind of filter), which can reduce the computational complexity and improve the coding efficiency.

Optionally, there may be many ways to classify pixels. In one example, only the luminance components Y of the pixels may be classified, and the chrominance components UV may not be classified. For example, the luminance components Y may be divided into 25 categories, and the chrominance components UV may not be divided, but only one category. In other words, for one frame of image, the encoding frame of the luminance components Y may correspond to a maximum of 25 sets of filters, and the encoding frame of the chrominance components UV may correspond to one set of filters.

It should be understood that, in the embodiments of the present disclosure, the pixel category may be a category corresponding to the luminance components Y, but this is not limited in the embodiments of the present disclosure and the pixel category may also be a category corresponding to other components or all components. For the convenience of description, the following description takes the classification, division and ALF filtering of the encoding frame of the luminance components Y as an example.

Optionally, in one embodiment, the reconstructed image frame after DB filtering and SAO filtering may be divided into a plurality of 4*4 pixel blocks. The plurality of 4*4 blocks may be classified.

For example, each 4*4 block may be classified according to a Laplace direction:

$$C = 5D + \hat{A},$$

where C represents the category to which the pixel block belongs, D is the Laplacian direction, and $\hat{A}$ is the result of the sub-classification after the direction D classification. $\hat{A}$ may be obtained in many ways, and here may only represent results of sub-categories.

The calculation method of direction D is as follows. First, the Laplace gradient of the current 4*4 block in different directions may be calculated. The calculation formulas are:

$$g_v = \sum_{k=i-2}^{i+3} \sum_{l=j-2}^{j+3} V_{k,l}, \quad V_{k,l} = |2R(k,l) - R(k, l-1) - R(k, l+1)|,$$

$$g_h = \sum_{k=i-2}^{i+3} \sum_{l=j-2}^{j+3} H_{k,l}, \quad H_{k,l} = |2R(k,l) - R(k-1, l) - R(k+1, l)|,$$

$$g_{d1} = \sum_{k=i-2}^{i+3} \sum_{l=j-3}^{j+3} D1_{k,l}, \quad D1_{k,l} = |2R(k,l) - R(k-1, l-1) - R(k+1, l+1)|,$$

$$g_{d2} = \sum_{k=i-2}^{i+3} \sum_{j=j-2}^{j+3} D2_{k,l}, \quad D2_{k,l} = |2R(k,l) - R(k-1, l+1) - R(k+1, l-1)|,$$

where i and j are the coordinates of an upper left pixel of the current 4*4 block, R(k,l) represents the reconstructed pixel value at position (k,l) in the 4*4 block, $V_{k,l}$ represents the Laplace gradient in the vertical direction of the pixel at the (k,l) coordinate in the 4*4 block, $H_{k,l}$ represents the Laplace gradient in the horizontal direction of the pixel at the (k,l) coordinate in the 4*4 block, $D1_{k,l}$ represents the Laplace gradient of the pixel at the (k,l) coordinate in the 4*4 block in the direction of 135 degrees, and $D2_{k,l}$ represents the Laplace gradient of the pixel at the (k,l) coordinate in the 4*4 block in the direction of 45 degrees.

Correspondingly, the calculated $g_v$ represents the Laplace gradient of the current 4*4 block in the vertical direction, $g_h$ represents the Laplace gradient of the current 4*4 block in the horizontal direction, $g_{d1}$ represents the Laplace gradient of the current 4*4 block in the direction of 135 degrees, and $g_{d2}$ represents the Laplace gradient of the current 4*4 block in the direction of 45 degrees.

Then, according to the extreme value ratio of the Laplace gradient in the four directions, the direction D may be determined, and the specific calculation formula is as follows:

$$g_{h,v}^{max} = \max(g_h, g_v), g_{h,v}^{min} = \min(g_h, g_v)$$

$$g_{d1,d2}^{max} = \max(g_{d1}, g_{d2}), g_{d1,d2}^{min} = \min(g_{d1}, g_{d2})$$

$$R_{h,v} = g_{h,v}^{max} / g_{h,v}^{min}$$

$$R_{d0,d1} = g_{d1,d2}^{max} / g_{d1,d2}^{min}$$

where $g_{h,v}^{max}$ represents the maximum value of the Laplace gradients in the horizontal and vertical directions, $g_{h,v}^{min}$ represents the minimum value of the Laplace gradients in the horizontal and vertical directions, $g_{d1,d2}^{max}$ represents the maximum value of the Laplace gradients in the directions of 45 and 135 degrees, $g_{d1,d2}^{min}$ represents the minimum value of the Laplace gradients in the directions of 45 and 135 degrees, $R_{h,v}$ represents the ratio of Laplace gradients in the horizontal and vertical directions, and $R_{d0,d1}$ represents the ratio of the Laplace gradients in the directions of 45 and 135 degrees.

When $g_{h,v}^{max} \leq t_1 \cdot g_{h,v}^{min}$ and $g_{d0,d1}^{max} \leq t_1 \cdot g_{d0,d1}^{min}$, D may be set to 0.

When $g_{h,v}^{max} / g_{h,v}^{min} > g_{d0,d1}^{max} / g_{d0,d1}^{min}$ and $g_{h,v}^{max} \leq t_2 \cdot g_{h,v}^{min}$, D may be set to 1.

When $g_{h,v}^{max} / g_{h,v}^{min} > g_{d0,d1}^{max} / g_{d0,d1}^{min}$ and $g_{h,v}^{max} < t_2 \cdot g_{h,v}^{min}$, D may be set to 2.

When $g_{h,v}{}^{max}/g_{h,v}{}^{min} \leq g_{d0,d1}{}^{max}/g_{d0,d1}{}^{min}$ and $g_{d0,d1}{}^{max} \leq t_2 \cdot g_{d0,d1}{}^{min}$, D may be set to 3.

When $g_{h,v}{}^{max}/g_{h,v}{}^{min} \leq g_{d0,d1}{}^{max}/g_{d0,d1}{}^{min}$ and $g_{d0,d1}{}^{max} > t_2 \cdot g_{d0,d1}{}^{min}$, D may be set to 4.

t1 and t2 may represent preset thresholds.

Optionally, in a possible implementation manner, Â may be calculated as follows:

$$A = \sum_{k=i-2}^{i+3} \sum_{l=j-2}^{j+3} (V_{k,l} + H_{k,l})$$

and A is quantized to obtain an integer between 0 and 4, to obtain Â.

Therefore, considering the values of D and A, the value range of C may be an integer between 0 and 24. In embodiments of the present disclosure, 4*4 blocks in one image frame may be divided into 25 categories at most.

Optionally, in a possible implementation manner, there may be N types of 4*4 blocks in the encoding frame, and each type of 4*4 blocks may have a set of ALF filter coefficients, where N is an integer between 1 and 25.

It should be understood that, in the embodiments of the present disclosure, besides being divided into multiple 4*4 blocks, the entire image frame may also be divided into blocks of other pixel sizes, for example, divided into multiple 8*8 or 16*16 blocks 16, which is not limited in the present disclosure.

It should also be understood that, in the embodiments of the present disclosure, in addition to the above-mentioned classification according to the Laplace direction, other classification methods may also be used to classify blocks, which are not limited in the embodiments of the present disclosure.

It should also be understood that, in the embodiments of the present disclosure, in addition to 25 types, the number of classifications may also be any other number, which is also not limited in the embodiments of the present disclosure.

Block-Based ALF Filtering

The ALF filtering may be frame-based ALF, block-based ALF, or quadtree-based ALF. The frame-based ALF may use a set of filter coefficients to filter the entire frame. The block-based ALF may divide the encoding frame into image blocks of equal size, and determine whether to perform ALF filtering on the image blocks. The quadtree-based ALF may divide the encoding frame into image blocks of different sizes based on quadtree division, and determine whether to perform ALF filtering. The frame-based ALF filtering may have simple calculation, but the filtering effect may be not good. The quadtree-based ALF may have high calculation complexity. Therefore, in some standards or technologies, such as the latest VVC standard that is being researched and formulated, a reference software VTM uses block-based ALFA Block-based ALF in VTM will be used as an example for description. In VTM, the encoding frame may have a frame-level ALF filter flag and a block-level ALF filter flag. Optionally, the block level may be a CTU, CU, or an image block of other division methods, which is not limited in embodiments of the present disclosure. For the convenience of description, the following will use the CTU-level ALF filter flag as an example to illustrate.

Specifically, when the frame-level ALF filtering flag indicates not to perform ALF filtering, the CTU-level ALF filtering flag in the encoding frame may be not marked. When the frame-level ALF filtering flag indicates to perform ALF filtering, the CTU-level ALF filtering flag bit in the encoding frame may be marked to indicate whether the current CTU performs ALF filtering.

Optionally, the encoding frame may include Z CTUs. The method for calculating N groups of ALF filter coefficients in the encoding frame may include: combining whether ALF filtering is to perform on the Z CTUs in the encoding frame; and for each combination, calculating and obtaining the rate-distortion cost (RD Cost) of the N groups of ALF filter coefficients and the encoding frame in the mode. The calculation method of the i-th group of ALFs in each group of ALF filter coefficients may include: under the current CTU combination mode, performing f calculation on the i-th type of pixels in the CTU that is subjected to ALF filtering, and not performing f calculation on other CTUs that are not subjected to ALF filtering, to obtain the i-th group of ALF coefficients under the current combination mode. It should be understood that under different combinations, the calculated N groups of ALF filter coefficients may be different from each other.

The RD costs under multiple combinations may be compared with each other. A combination with the smallest RD cost may be determined as the final combination, and the N groups of ALF filter coefficients calculated in this combination mode may be determined as the ALF filter coefficients with the best adaptability.

When the combination with the smallest RD Cost is used to perform ALF filtering on at least one of the Z CTUs, the frame-level ALF flag of the encoding frame may be marked as performing ALF filtering, and the CTU-level ALF flag bit in turn may indicate whether ALF filtering is to be performed on the CTU data. For example, the flag of 0 may mean that ALF filtering is not performed, and the flag is of 1 may mean that ALF filtering is performed.

In particular, when the combination with the smallest RD cost is that none of the Z CTUs perform ALF filtering, the encoding frame may not perform ALF filtering, and the frame-level ALF flag of the encoding frame may be marked as not performing ALF filtering. At this time, the ALF flag bit of the CTU level may be not marked.

It should be understood that the ALF in the embodiments of the present disclosure is not only applicable to the VVC standard, but also applicable to other technical solutions or standards using the block-based ALF.

Cross-Component ALF (CC-ALF)

In one example, the CC-ALF may be used to adjust the chrominance components by using the value of the luminance components, to improve the quality of the chrominance components. For ease of understanding, an example of the CC-ALF and ALF processes is described below with reference to FIG. 6. The current block includes luminance components and chrominance components, where the chrominance components include a first chrominance component (Cb in FIG. 6) and a second chrominance component (Cr in FIG. 6).

The luminance component may be filtered sequentially by SAO and ALF. The first chrominance component may be sequentially filtered by SAO and ALF. The second chrominance component may be sequentially filtered by SAO and ALF. In addition, CC-ALF may be also performed on the chrominance components using a CC-ALF filter.

Figure 7:
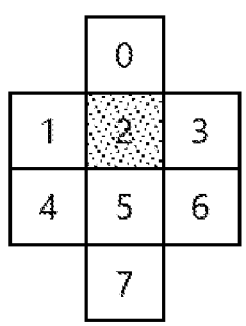
FIG. 7 is a schematic diagram of a CC-ALF filter consistent with an embodiment of the present disclosure.

In one example, the shape of the CC-ALF filter may be as shown in FIG. 7, and a 3×4 diamond shape is used in this CC-ALF filter, with a total of 8 coefficients. In FIG. 7, the position of the marker 2 is the current pixel of the first chrominance component or the second chrominance component, and the weighted average of the surrounding 7 points is used to obtain the result of filtering the pixel at the position of the middle marker 2.

There may totally be multiple sets of filters in one frame of image, and the first chrominance component and the second chrominance component may select the same or different target filters from the same set of CC-ALF filters for filtering, or select the target filter from different CC-ALF filters for filtering.

The total number of CC-ALF filters used in the current image may need to be written into the stream. The total number of CC-ALF filters may include the total number of CC-ALF filters for the first chrominance component and/or the total number of CC-ALF filters for the second chrominance component. When the total number of CC-ALF filters for the first chrominance component and the total number of CC-ALF filters for the second chrominance component is same, or when the first chrominance component and the second chrominance component select the target filter from the same set of CC-ALF filters, only one total number of the CC-ALF filters may be used for indication.

For the current block, the index of the target filter selected by the current block may be also encoded into the stream. In the case that the indices of the target filters selected by the first chrominance component and the second chrominance component are the same or different, the indices of the target filters of the two chrominance components may be encoded into the stream respectively. Alternatively, in the case where the indexes of the target filters selected by the first chrominance component and the second chrominance component are the same, only one index may be encoded into the stream, and the index may be used to indicate the target filters of the two chrominance components.

Figure 6:
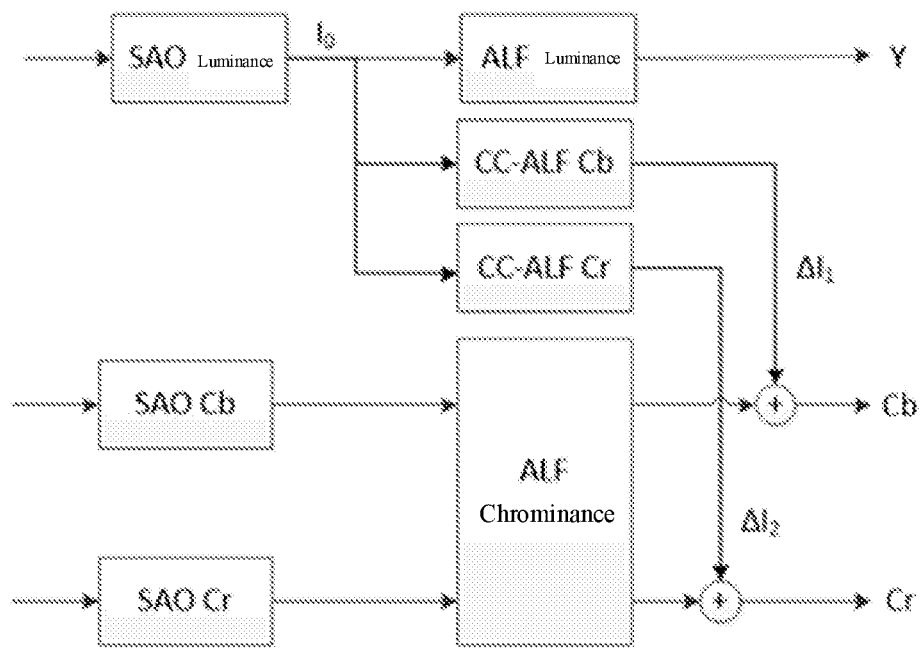
FIG. 6 is a flowchart of an in-loop filter method consistent with an embodiment of the present disclosure.

A detailed explanation will be given below with reference to FIG. 6.

Specifically, for the first chrominance component, the target filter of the first chrominance component of the current block may be determined from a plurality of CC-ALF filters. According to the luminance component without ALF (for example, after SAO and without ALF) and the first chrominance component of the current block after ALF, the target filter coefficients for the first chroma component may be determined. The first chrominance component may be filtered according to the target filter and target filter coefficients for the first chrominance component. Then, the filtering result of the first chrominance component may be determined according to the first chrominance component filtered by the target filter and the target filter coefficient and the first chrominance component after ALF (for example, after SAO and ALF in sequence).

For the second chroma component, the target filter of the second chrominance component of the current block may be determined from a plurality of CC-ALF filters. According to the luminance component without ALF (for example, after SAO and without ALF) and the second chrominance component of the current block after ALF, the target filter coefficients for the second chroma component may be determined. The second chrominance component may be filtered according to the target filter and target filter coefficients for the second chrominance component. Then, the filtering result of the second chrominance component may be determined according to the second chrominance component filtered by the target filter and the target filter coefficient and the second chrominance component after ALF (for example, after SAO and ALF in sequence).

When the current block is being encoded, the total number of filters of multiple CC-ALFs may be encoded into the stream as a syntax element. The index of the target filter selected by the first chrominance component of the current block, and the index of the target filter selected by the second chrominance component of the current block may be also encoded into the stream as a syntax element.

In one example, the number of syntax elements used to indicate the total number of multiple CC-ALF filters in the stream of one frame of image may be only one. In one example, the syntax element used to indicate the total number of multiple CC-ALF filters may be located in the adaptation parameter set syntax of the image. In one example, the syntax element indicating the total number of the plurality of cross-component ALF filters may be not present in the image header and/or the slice header.

In one example, a truncated binary code may be used to encode the syntax element indicating the total number of multiple CC-ALF filters. In one example, the index of the target filter may be encoded using the truncated binary code.

For the current block, the target filter coefficients for the first chrominance component and the target filter coefficients for the second chrominance component of the current block may be also encoded into the stream.

After receiving the stream, the decoding end may decode the indices of the target filter selected by the chrominance components of the current block and the total number of CC-ALF filters from the stream, and determine the CC-ALF filters of the chrominance components of the current block according to the indices and the total number. The decoding end may also decode the target filter coefficients for the chrominance components of the current block from the stream, to filter the chrominance components of the current block after ALF according to the target filters and the target filter coefficients.

The technical solutions of the embodiments of the present disclosure may be applied to both the encoding end and the decoding end. The technical solutions of the embodiments of the present disclosure are described below from the encoding end and the decoding end, respectively.

Figure 8:
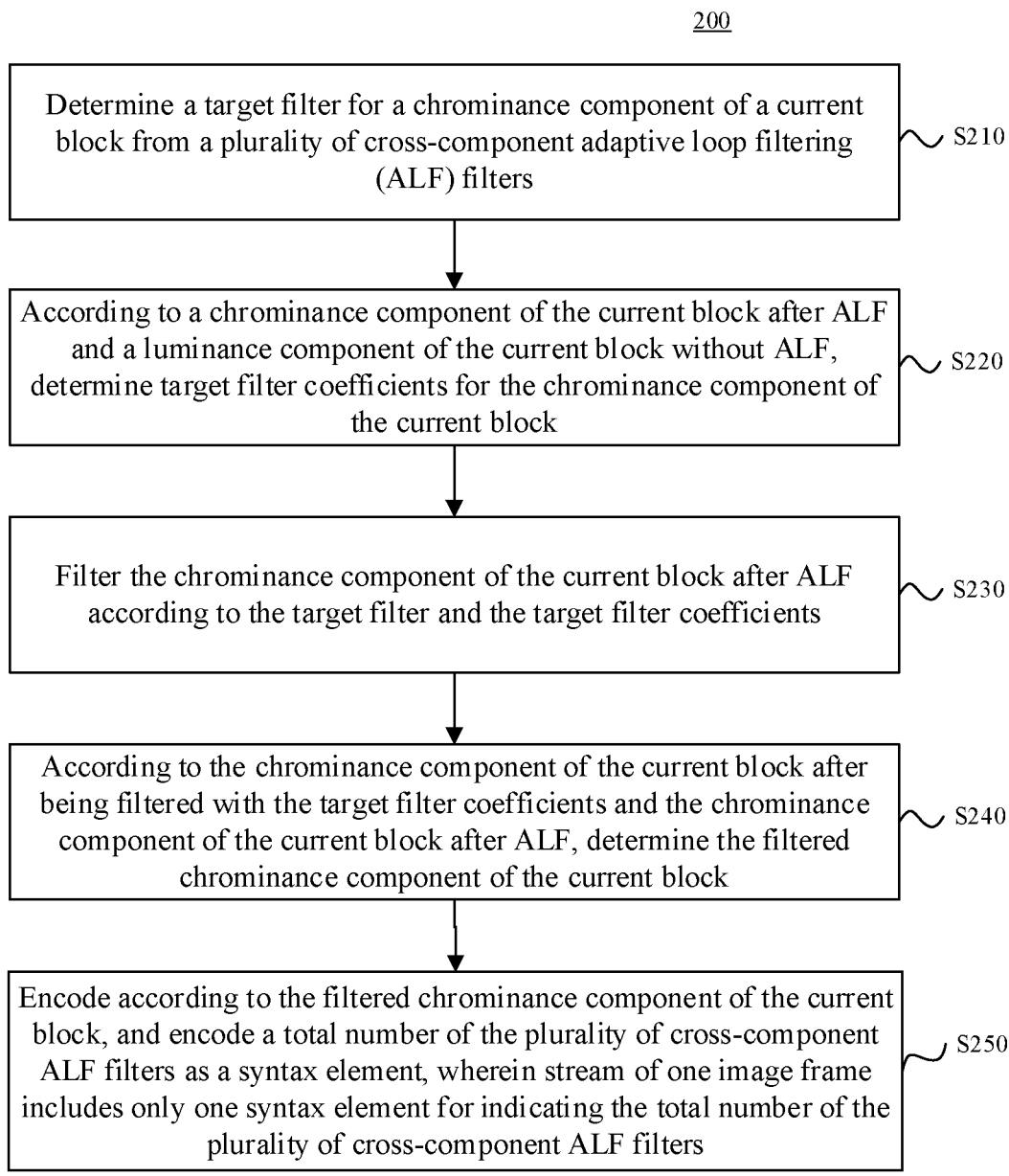
FIG. 8 is a flowchart of an in-loop filter method consistent with another embodiment of the present disclosure.

FIG. 8 is a schematic flowchart of an in-loop filtering method 200 according to one embodiment of the present disclosure. The method 200 may be performed by the encoding end. For example, it may be performed by the system 100 shown in FIG. 1 while performing an encoding operation. The method 200 includes:

S210: determining a target filter for the chrominance component of the current block from a plurality of cross-component adaptive loop filtering (ALF) filters;

S220: determining target filter coefficients for the chrominance component of the current block according to the chrominance component of the current block after ALF and the luminance components of the current block without ALF;

S230: filtering the chrominance component of the current block after ALF according to the target filter and the target filter coefficients;

S240: determining the filtered chrominance component of the current block according to the chrominance component filtered by the target filter coefficients and the chrominance component of the current block after ALF; and S250: encoding according to the filtered chrominance component of the current block, and encoding the total number of the multiple cross-component ALF filters as a syntax element.

The stream of one image frame may only contain one syntax element indicating the total number of the plurality of cross-component ALF filters.

Optionally, the syntax element for indicating the total number of the plurality of cross-component ALF filters may be located in the adaptation parameter set syntax of the image.

Optionally, the syntax element for indicating the total number of the plurality of cross-component ALF filters may be not present in the image header and/or the slice header.

Optionally, the chrominance component of the current block after ALF may be specifically the chrominance component of the current block after the sample adaptive offset (SAO) filtering and the ALF sequentially.

Optionally, the luminance component of the current block without ALF may be specifically the luminance component of the current block after SAO and without ALF.

Optionally, encoding the total number of the multiple cross-component ALF filters as the syntax element may include: using a truncated binary code to encode the total number of the multiple cross-component ALF filters.

Optionally, the method may further include: encoding the index of the target filter as a syntax element.

Optionally, encoding the index of the target filter as a syntax element may include: using a truncated binary code to encode the index of the target filter.

Optionally, the method may further include: encoding the target filter coefficients for the chrominance component of the current block into the stream.

Figure 9:
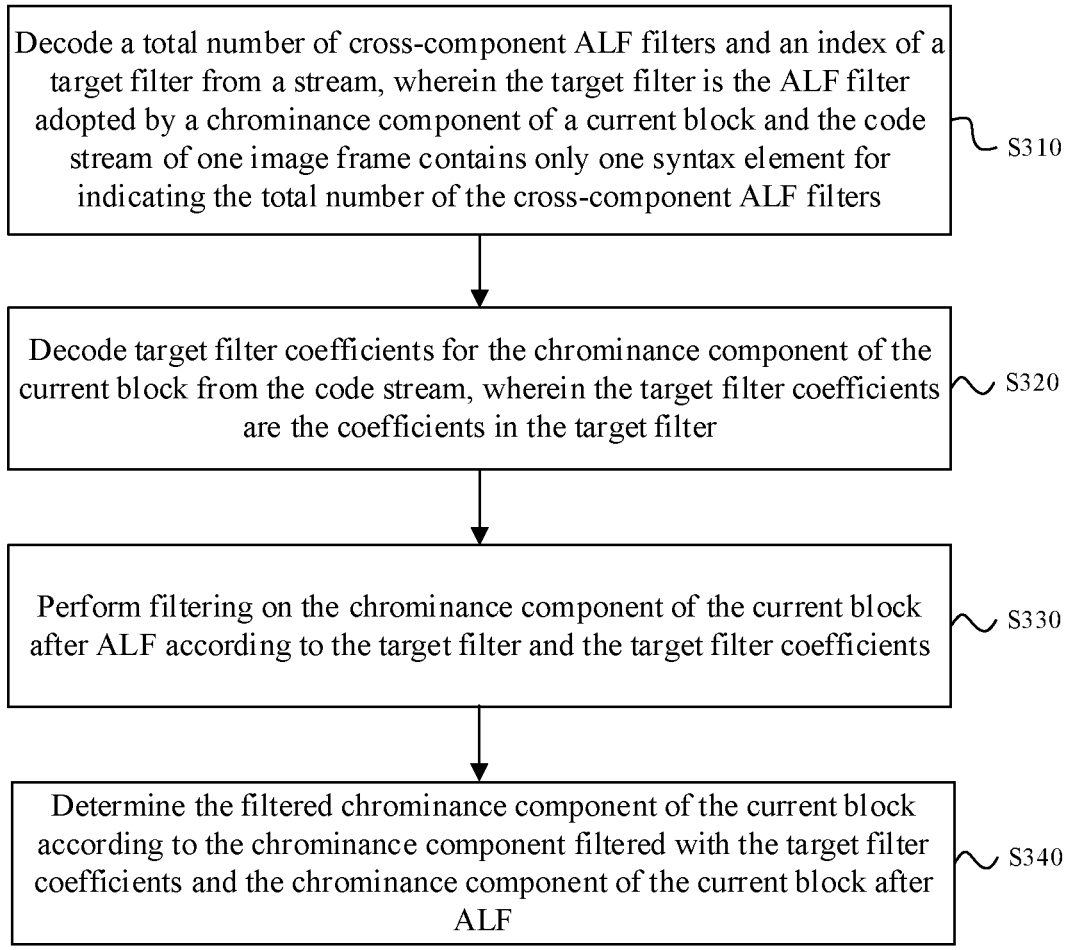
FIG. 9 is a flowchart of an in-loop filter method consistent with another embodiment of the present disclosure.

FIG. 9 is a schematic flowchart of an in-loop filtering method 300 according to another embodiment of the present disclosure. The method 300 may be performed by an encoding end.

For example, it may be performed by the system 100 shown in FIG. 1 while performing a decoding operation. The method includes:

S310: decoding the total number of cross-component ALF filters and the index of the target filter from the stream, where the target filter is the ALF filter adopted by the chrominance component of the current block and the stream of one image frame contains only one syntax element indicating the total number of cross-component ALF filters;

S320: decoding the target filter coefficients for the chrominance component of the current block from the stream, where the target filter coefficients are coefficients in the target filter;

S330: performing cross-component filtering on the chrominance component of the current block after ALF according to the target filter and the target filter coefficients; and S340: determining the filtered chrominance component of the current block according to the chrominance component filtered by the target filter coefficients and the chrominance component of the current block after ALF.

Optionally, the syntax element for indicating the total number of the cross-component ALF filters may be located in an adaptation parameter set syntax of the image.

Optionally, the syntax element for indicating the total number of cross-component ALF filters may be not present in an image header and/or slice header.

Optionally, the chrominance component of the current block after ALF may be specifically the chrominance component of the current block after the sample adaptive offset (SAO) filtering and the ALF sequentially.

Optionally, the luminance component of the current block without ALF may be specifically the luminance component of the current block after SAO and without ALF.

Optionally, decoding the total number of the cross-component ALF filters and the indices of the target filters from the stream may include: adopting a truncated binary code to decode the total number of the cross-component ALF filters and/or the indices of the target filters.

Figure 10:
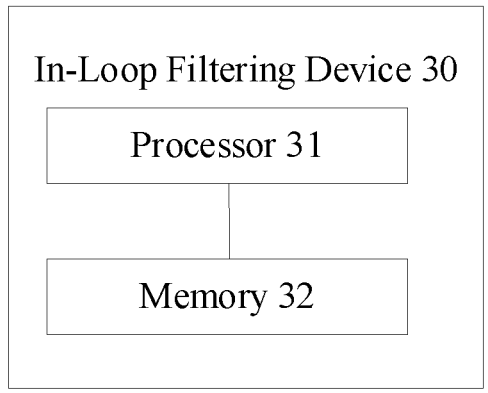
FIG. 10 is a flowchart of an in-loop filter device consistent with another embodiment of the present disclosure.

FIG. 10 is a schematic block diagram of another in-loop filtering device 30 at an encoding end according to an embodiment of the present disclosure. The in-loop filtering device 30 may be an in-loop filtering device in a video encoding end. Optionally, the in-loop filtering device 30 may correspond to the in-loop filtering method 200.

As shown in FIG. 10, the in-loop filtering device 30 includes a processor 31 and a memory 32.

The memory 32 may be configured to store programs, and the processor 31 may be configured to execute the programs stored in the memory to:

determine a target filter for the chrominance component of the current block from a plurality of cross-component adaptive loop filtering (ALF) filters;

determine target filter coefficients for the chrominance component of the current block from the chrominance component of the current block after ALF and the luminance component of the current block without ALF;

filter the chrominance component of the current block after ALF according to the target filter and the target filter coefficients;

determine the filtered chrominance component of the current block according to the chrominance component filtered by the target filter coefficient and the chrominance component of the current block after ALF; and encode according to the filtered chrominance component of the current block, and encode the total number of the plurality of cross-component ALF filters as a syntax element, where the stream of one image frame contains only one syntax element for indicating the total number of the plurality of cross-component ALF filters.

The syntax element for indicating the total number of the plurality of cross-component ALF filters may be located in the adaptation parameter set syntax of the image.

Optionally, the syntax element for indicating the total number of cross-component ALF filters may be not present in an image header and/or slice header.

Optionally, the chrominance component of the current block after ALF may be specifically the chrominance component of the current block after the sample adaptive offset (SAO) filtering and the ALF sequentially.

Optionally, the luminance component of the current block without ALF may be specifically the luminance component of the current block after SAO and without ALF.

Optionally, encoding the total number of the plurality of cross-component ALF filters as the syntax element, may include:

encoding the total number of the plurality of cross-component ALF filters using a truncated binary code.

Optionally, the processor may be further configured to:

Encode the indices of the target filters as the syntax elements.

Optionally, encoding the indices of the target filters as the syntax elements may include:

encoding the indices of the target filters using a truncated binary code.

It should be understood that the device embodiments and the method embodiments correspond to each other, and for similar descriptions, reference may be made to the method embodiments.

Figure 11:
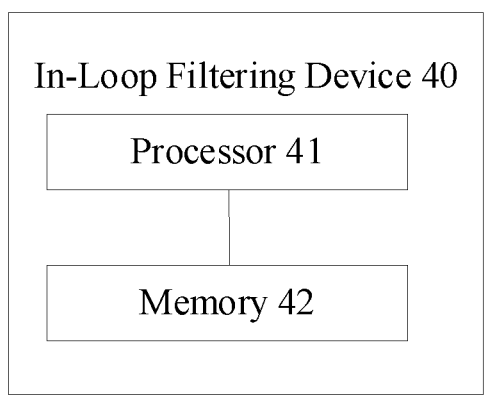
FIG. 11 is a flowchart of an in-loop filter device consistent with another embodiment of the present disclosure.

FIG. 11 is a schematic block diagram of another in-loop filtering device 40 according to another embodiment of the present disclosure. Optionally, the in-loop filtering device 40 may correspond to the in-loop filtering method 300.

As shown in FIG. 11, the in-loop filtering device 40 includes: a processor 41 and a memory 42.

The memory 42 may be configured to store programs, and the processor 41 may be configured to execute the programs stored in the memory to:

decode the total number of cross-component ALF filters and the index of the target filter from the stream, where the target filter is the ALF filter adopted by the chrominance component of the current block and the stream of one image frame contains only one syntax element for indicating the total number of the plurality of cross-component ALF filters;

decode the target filter coefficients for the chrominance component of the current block from the stream, where the target filter coefficients are the coefficients in the target filter;

perform cross-component filtering on the chrominance component of the current block after ALF according to the target filter and the target filter coefficients; and determine the filtered chrominance component of the current block according to the chrominance component filtered by the target filter coefficients and the chrominance component of the current block after ALF.

Optionally, the syntax element for indicating the total number of the cross-component ALF filters may be located in an adaptation parameter set syntax of the image.

Optionally, the syntax element for indicating the total number of cross-component ALF filters may be not present in an image header and/or slice header.

Optionally, the chrominance component of the current block after ALF may be specifically the chrominance component of the current block after the sample adaptive offset (SAO) filtering and the ALF sequentially.

Optionally, the luminance component of the current block without ALF may be specifically the luminance component of the current block after SAO and without ALF.

Optionally, decoding the total number of the cross-component ALF filters and the indices of the target filters from the stream may include: adopting a truncated binary code to decode the total number of the cross-component ALF filters and/or the indices of the target filters.

An embodiment of the present disclosure further provides an electronic device, and the electronic device may include any in-loop filtering device according to the various embodiments of the present disclosure.

It should be understood that the processor in various embodiments of the present disclosure may be an integrated circuit chip with a signal processing capability. In the implementation process, each process of the above method embodiments may be completed by a hardware integrated logic circuit in a processor or an instruction in the form of software. The above-mentioned processors include but are not limited to: general-purpose processors, central processing units (CPUs), digital signal processors (digital signal processors, DSPs), application specific integrated circuits (application specific integrated circuits, ASICs), off-the-shelf programmable gate arrays field programmable gate array (FPGA) or other programmable logic devices, discrete gate or transistor logic devices, or discrete hardware components, which can implement or execute the methods, steps, and logic block diagrams disclosed in the embodiments of the present disclosure. A general purpose processor may be a microprocessor or a general processor. The processes of the methods disclosed in conjunction with the embodiments of the present disclosure may be directly embodied as executed by a hardware decoding processor, or executed by a combination of hardware and software modules in the decoding processor. The software module may be located in a random access memory, a flash memory, a read-only memory, a programmable read-only memory, an electrically erasable programmable memory, registers, or other storage media mature in the art. The storage medium may be located in the memory, and the processor may read the information in the memory and complete the steps of the above methods in combination with its hardware.

It can be understood that the memory of the embodiments of the present disclosure may be a volatile memory or a non-volatile memory, or may include both volatile and non-volatile memory. The non-volatile memory may be a read-only memory (ROM), a programmable read-only memory (PROM), an erasable programmable read-only memory (EPROM), an electrically programmable erase programmable read-only memory (electrically EPROM, EEPROM) or a flash memory. The volatile memory may be a random access memory (RAM), which acts as an external cache. By way of example and not limitation, many forms of RAM are available, such as static random access memory (SRAM), dynamic random access memory (DRAM), synchronous DRAM, SDRAM), double data rate synchronous dynamic random access memory (double data rate SDRAM, DDR SDRAM), enhanced synchronous dynamic random access memory (enhanced SDRAM, ESDRAM), synchronous link dynamic random access memory (synchlink DRAM, SLDRAM), or direct memory bus random access memory (direct rambus RAM, DR RAM). It should be noted that the memory of the systems and methods described herein is intended to include, but not be limited to, these and any other suitable types of memory.

The present disclosure also provides a computer-readable storage medium, configured to store one or more programs, and the one or more programs may include instructions. The instructions, when executed by a portable electronic device including multiple application programs, may cause the portable electronic device to execute the methods of the embodiments shown in FIG. 6 to FIG. 14.

The embodiments of the present disclosure also provide a computer program, where the computer program includes instructions. When the computer program is executed by a computer, the computer may execute the methods of the embodiments shown in FIG. 6 to FIG. 14.

The embodiments of the present disclosure also provide a chip. The chip may include an input/output interface, at least one processor, at least one memory, and a bus. The at least one memory may be configured to store instructions, and the at least one processor may be configured to call the instructions in the at least one memory, to execute the methods of the embodiments shown in FIG. 6 to FIG. 14.

Those of ordinary skill in the art can realize that the units and algorithm steps of each example described in conjunction with the embodiments disclosed herein may be implemented in electronic hardware, or a combination of computer software and electronic hardware. Whether these functions are performed in hardware or software depends on the specific application and design constraints of the technical solution. Those of ordinary skill in the art may implement the described functionality using different methods for each particular application, but such implementations should not be considered beyond the scope of the present disclosure.

Those skilled in the art can clearly understand that, for the convenience and brevity of description, the specific working process of the system, device and unit described above may refer to the corresponding process in the foregoing method embodiments, which will not be repeated here.

In the several embodiments provided in the present disclosure, it should be understood that the disclosed system, apparatus and method may be implemented in other manners. For example, the apparatus embodiments described above are only illustrative. For example, the division of the units is only a logical function division. In actual implementation, there may be other division methods. For example, multiple units or components may be combined or can be integrated into another system, or some features can be ignored, or not implemented. On the other hand, the shown or discussed mutual coupling or direct coupling or communication connection may be through some interfaces, indirect coupling or communication connection of devices or units, and may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in embodiments.

In addition, each functional unit in each embodiment of the present application may be integrated into one processing unit, or each unit may exist physically alone, or two or more units may be integrated into one unit.

The functions, if implemented in the form of software functional units and sold or used as independent products, may be stored in a computer-readable storage medium. Based on this understanding, the technical solutions of the present application can be embodied in the form of software products in essence, or the parts that contribute to the prior art or the parts of the technical solutions, and the computer software products are stored in a storage medium, including several instructions to cause a computer device (which may be a personal computer, a server, or a network device, etc.) to execute all or some of the processes of the methods described in the various embodiments of the present application. The aforementioned storage medium includes: a U disk, a removable hard disk, a read only memory (ROM), a random access memory (RAM), a magnetic disk or an optical disk and other media that can store program codes.

The above are only specific implementations of embodiments of the present disclosure, but the scope of protection of the present disclosure is not limited to this. Anyone familiar with the technical field can easily think of various equivalents within the technical scope disclosed in the present disclosure. These modifications or replacements shall be covered within the scope of protection of the present disclosure. Therefore, the protection scope of the present disclosure shall be subject to the protection scope of the claims.

What is claimed is:

1. An in-loop filtering method comprising:
    determining a target filter for a chrominance component of a current block of an image from a plurality of cross-component adaptive loop filtering (ALF) filters;
    determining target filter coefficients for the chrominance component of the current block according to the chrominance component after ALF and a luminance component of the current block without ALF;
    filtering the chrominance component after ALF according to the target filter and the target filter coefficients;
    determining a filtered chrominance component of the current block according to the chrominance component after being filtered with the target filter coefficients and the chrominance component after the ALF;
    encoding according to the filtered chrominance component of the current block; and
    encoding a total number of the plurality of cross-component ALF filters as a syntax element of a bitstream;
    wherein the syntax element for indicating the total number of the plurality of cross-component ALF filters is only located in an adaptation parameter set syntax of the image, and not present in an image header and/or a slice header.

2. The in-loop filtering method according to claim 1, wherein:
    the chrominance component after ALF is the chrominance component after sample adaptive offset (SAO) filtering and ALF sequentially.

3. The in-loop filtering method according to claim 1, wherein:
    the luminance component without ALF is the luminance component after sample adaptive offset (SAO) and without ALF.

4. The in-loop filtering method according to claim 1, wherein encoding the total number of the plurality of cross-component ALF filters as the syntax element includes:
    encoding the total number of the plurality of cross-component ALF filters using a truncated binary code.

5. The in-loop filtering method according to claim 1,
    wherein the syntax element is a first syntax element;
    the method further comprising:
        encoding an index of the target filter as a second syntax element.

6. The in-loop filtering method according to claim 5, wherein encoding the index of the target filter as the second syntax element includes:
    encoding the index of the target filter using a truncated binary code.

7. An in-loop filtering method comprising:
    decoding a total number of cross-component adaptive loop filtering (ALF) filters and an index of a target filter from a stream, the target filter being an ALF filter adopted by a chrominance component of a current block of an image and a target cross-component ALF filter;
    decoding target filter coefficients for the chrominance component from the stream, the target filter coefficients being coefficients in the target cross-component ALF filter;
    performing filtering on the chrominance component after ALF according to the target cross-component ALF filter and the target filter coefficients; and
    determining a filtered chrominance component of the current block according to the chrominance component filtered with the target filter coefficients and the chrominance component after ALF;
    wherein a syntax element for indicating the total number of the plurality of cross-component ALF filters is only located in an adaptation parameter set syntax of the image, and not present in an image header and/or a slice header.

8. The in-loop filtering method according to claim 7, wherein:
    the chrominance component after ALF is the chrominance component after sample adaptive offset (SAO) filtering and ALF sequentially.

9. The in-loop filtering method according to claim 7, wherein:
a luminance component of the current block without ALF is the luminance component of the current block after sample adaptive offset (SAO) filtering and without ALF.

10. The in-loop filtering method according to claim 7, wherein decoding the total number of the cross-component ALF filters and the index of the target filter from the stream includes:
decoding the total number of the cross-component ALF filters and/or the index of the target filter using a truncated binary code.

11. A bitstream generation method comprising:
determining a target filter for a chrominance component of a current block of an image from a plurality of cross-component adaptive loop filtering (ALF) filters;
determining target filter coefficients for the chrominance component of the current block according to the chrominance component after ALF and a luminance component of the current block without ALF;
filtering the chrominance component after ALF according to the target filter and the target filter coefficients;
determining a filtered chrominance component of the current block according to the chrominance component after being filtered with the target filter coefficients and the chrominance component after the ALF;
encoding according to the filtered chrominance component of the current block to generate a bitstream; and
encoding a total number of the plurality of cross-component ALF filters as a syntax element of the bitstream;
wherein a syntax element for indicating the total number of the plurality of cross-component ALF filters is only located in an adaptation parameter set syntax of the image, and not present in an image header and/or a slice header.

12. The bitstream generation method according to claim 11, wherein:
the chrominance component after ALF is the chrominance component after sample adaptive offset (SAO) filtering and ALF sequentially.

13. The bitstream generation method according to claim 11, wherein:
the luminance component without ALF is the luminance component after sample adaptive offset (SAO) and without ALF.

14. The bitstream generation method according to claim 11, wherein encoding the total number of the plurality of cross-component ALF filters as the syntax element includes:
encoding the total number of the plurality of cross-component ALF filters using a truncated binary code.

* * * * *